United States Patent
Howell et al.

(10) Patent No.: US 7,073,498 B2
(45) Date of Patent: Jul. 11, 2006

(54) COMBINATION STEAMER CONE, RIM AND TRAY

(75) Inventors: Henry J. Howell, Long Beach, CA (US); Mitchell H. Babkes, Saugus, CA (US)

(73) Assignee: Sylmark Holdings Limited, Dublin (IE)

(*) Notice: Subject to any disclaimer, the term of this patent is extended or adjusted under 35 U.S.C. 154(b) by 660 days.

(21) Appl. No.: 10/409,921

(22) Filed: Apr. 9, 2003

(65) Prior Publication Data

US 2004/0200360 A1    Oct. 14, 2004

(51) Int. Cl.
*A47J 27/00* (2006.01)
*A47J 27/58* (2006.01)

(52) U.S. Cl. .............. 126/381.1; 126/383.1; 126/384.1

(58) Field of Classification Search ........... 126/381.1, 126/383.1, 384.1, 369, 382
See application file for complete search history.

(56) References Cited

U.S. PATENT DOCUMENTS 5,481,967 A * 1/1996 Chen ................ 99/446
6,526,875 B1 * 3/2003 Dzbinski ............ 99/339
D495,196 S * 8/2004 Howell et al. .......... D7/361
2002/0129714 A1 * 9/2002 Lee et al. ............ 99/403

FOREIGN PATENT DOCUMENTS

EP    0712596 A1    10/1995

OTHER PUBLICATIONS www.store.europe.yahoo.com/larinascente Cuiciaroma di Ballarini, Kitchenjohy-Brathaube.
www.onlineshoppingstores.net The Ultimate Food Steamers.

* cited by examiner

Primary Examiner—Alfred Basichas
(74) Attorney, Agent, or Firm—Kathy Mojibi Kavcioglu

(57) ABSTRACT

A combination cone, collection rim and steamer tray placeable on a wide variety of conventional cooking pots and pans. The device permits a user to selectively prevent heat and/or moisture from escaping a cooking pot. The collection rim contains a reservoir that collects moisture and prevents it from returning to a cooking pot while the cone simultaneously retains most of the heat escaping from the pot upon which the cone and collection rim rests. The steamer tray permits a user to steam cook foods in combination with the cone which collects and returns moisture to a pot on which the cone and steamer tray rests.

11 Claims, 4 Drawing Sheets

COMBINATION STEAMER CONE, RIM AND TRAY

FIELD OF THE INVENTION

The present invention generally relates to a steamer for use in cooking, and more specifically, to a steamer cone, rim and tray for collecting and preventing the return of, or collecting and returning, moisture to a cooking pot or pan.

BACKGROUND OF THE INVENTION

The use of steamers for cooking food is widely known. Such devices are commonly used to steam cook a variety of foods, such as vegetables, where the use of a direct heat source is undesirable. Accordingly, the need and desirability for such devices is without question, and need not be discussed herein.

Numerous designs have been utilized over the years for cooking steamers. For instance, most conventional steamers utilize a relatively shallow stainless steel insert which may be placed within a deep pot, in which boiling water is placed. The steam from the boiling water rises through holes in the bottom of the stainless steel insert, thereby steam-cooking food placed therein. Typically, steamers are configured to match within a pot having a particular size so that the pot's lid can be used to seal or cover the steamer. Other steamers also provide tapers or tiered steps on their underside so that they fit into many sizes of saucepans.

Although these designs are effective, each is limited in providing a steamer that allows water to cascade and fall back into the cooking pot or pan above which the steamer is placed. This is desirable in many conventional steam cooking applications. However, these designs do not provide conventional steam cooking capabilities while also providing a device that is operable to permit heat to escape while collecting and preventing moisture from returning to a cooking pot or pan. It will be appreciated that such a feature is desirable in a wide variety of cooking scenarios.

Thus, an unresolved need exists in the industry for a steamer device that collects and returns, or collects and prevents from returning, moisture generated by a cooking pot or pan.

SUMMARY OF THE INVENTION

Briefly stated, the present invention provides for a combination cone and collection or steamer tray placeable on a wide variety of conventional cooking pots and pans. The invention provides the ability to selectively prevent heat and/or moisture from escaping a cooking pot. More specifically, devices in accordance with the present invention allow for steam cooking of foods, such as vegetables, where collected moisture is returned to a cooking pot, or the retaining of heat produced by a cooking pot while collecting and preventing moisture from returning to the cooking pot.

According to one embodiment of the invention, there is disclosed a cooking device. The cooking device includes a cone comprising a top, a bottom, and a sloped side located there between, a handle, attached to the cone, and a collection rim removably affixed to the cone. The collection rim preferably includes a hole disposed in the center thereof, the hole being larger than, and disposed directly beneath, the top of the cone.

According to one aspect of the invention, the cone top comprises a small opening therein, and the cone bottom comprises a substantially flat edge protruding there from. According to another aspect of the invention, the device further includes a cap, the cap being removably inserted into the small opening of the cone top. According to yet another aspect of the invention, the collection rim includes a plurality of through holes, the centers of each through hole being arranged to define a single circle of through holes distributed in the collection rim.

Furthermore, according to the invention, each of the plurality of through holes can include side walls that extending vertically from, and define the center of, the through holes. Additionally, the collection rim can include a plurality of graduated concentric levels, the graduated concentric levels operable to engage cooking pots of varying widths. The plurality of through holes may also each be located in a single graduated concentric level of the collection rim.

According to another aspect of the invention, the collection rim can further include an inner wall defining the inner edge of a collection area operable to retain moisture. Moreover, the collection rim is operable to collect and retain moisture collected by the cone. According to yet another embodiment of the invention, the cone is constructed of heat resistant glass, and the collection rim comprises stainless steel. The handle of the device may also comprise injection-molded plastic.

According to yet another aspect of the invention, the substantially flat edge of the cone bottom includes at least two indentations therein. The collection rim can include at least two clips formed therein, where the at least two clips engage the substantially flat edge of the cone to removably affix the collection rim to the cone.

BRIEF DESCRIPTION OF THE DRAWINGS

Figure 1:
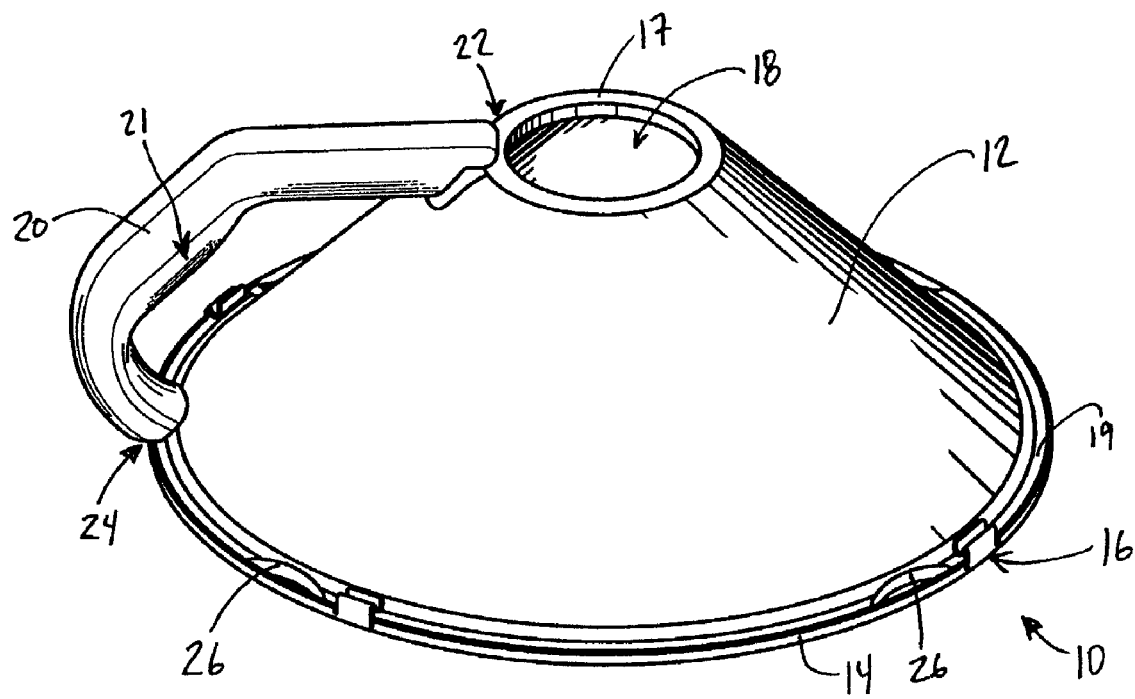

Having thus described the invention in general terms, reference will now be made to the accompanying drawings, which are not necessarily drawn to scale, and wherein:

FIG. 1 is a perspective view of a combined cone and collection rim, according to one embodiment of the invention.

Figure 2:
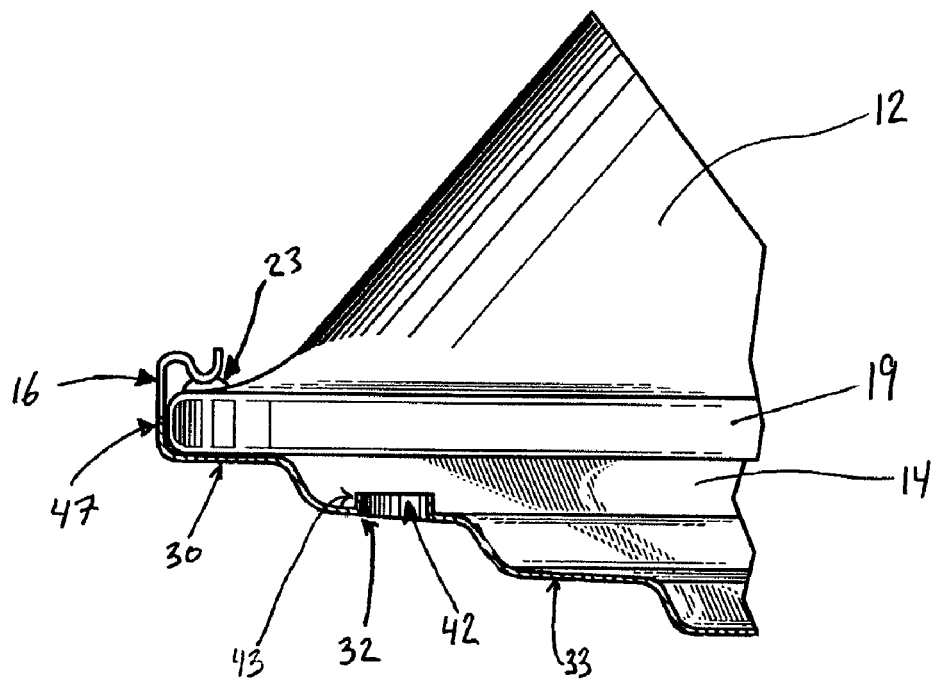

FIG. 2 is a partial cross sectional view of a side of the combined cone and collection rim of FIG. 1, according to one embodiment of the present invention.

Figure 3:
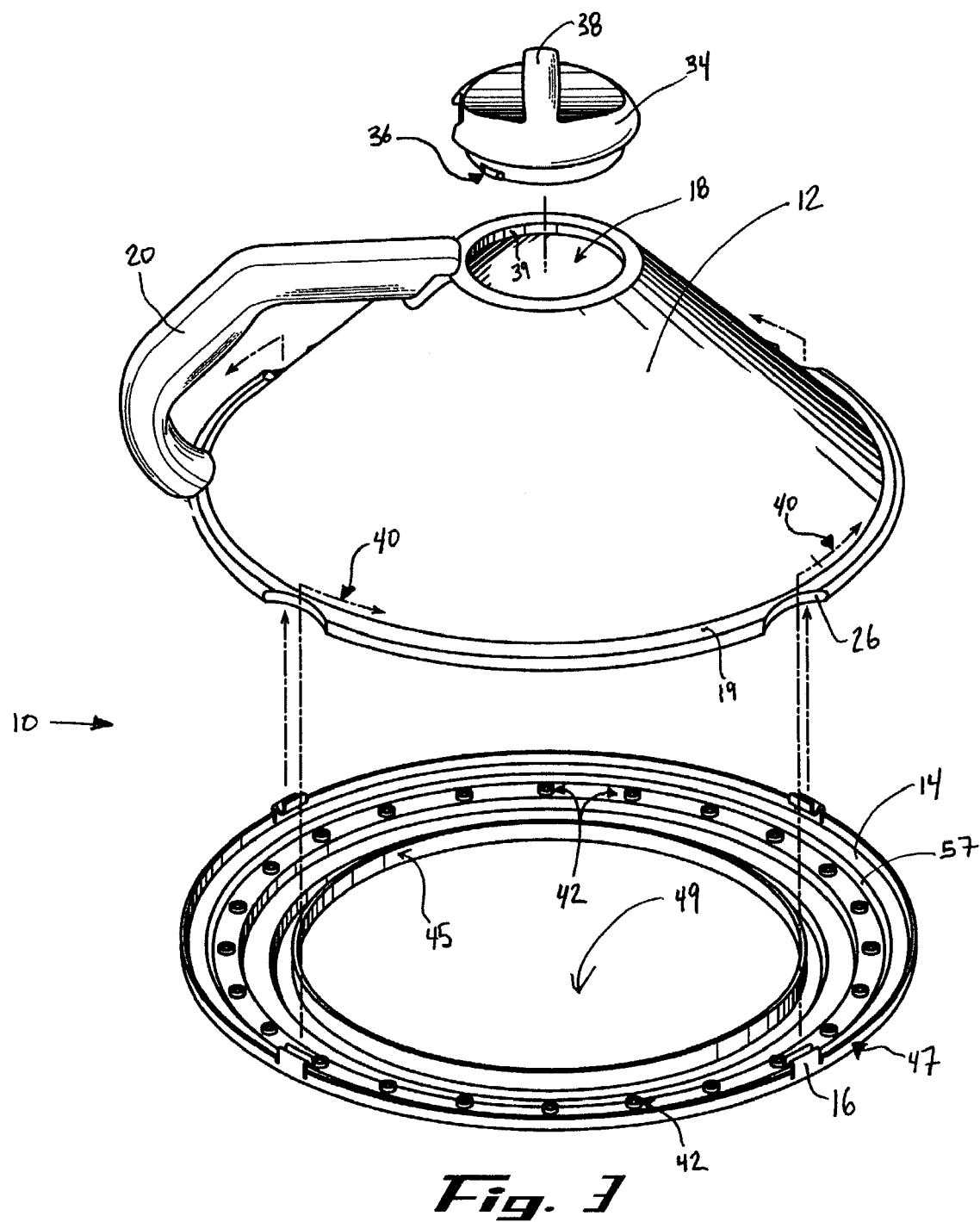

FIG. 3 is a exploded view of the combined cone and collection rim of FIG. 1, including a cap, according to one embodiment of the present invention.

Figure 4:
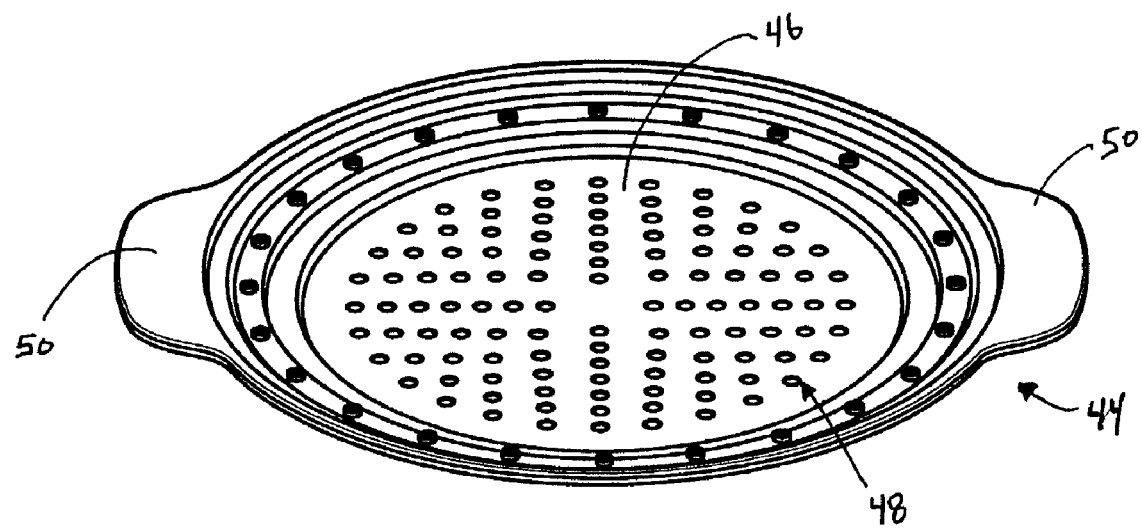

FIG. 4 is a perspective view of a steamer tray for use with the cone illustrated in FIGS. 1–3, according to one embodiment of the present invention.

Figure 5:
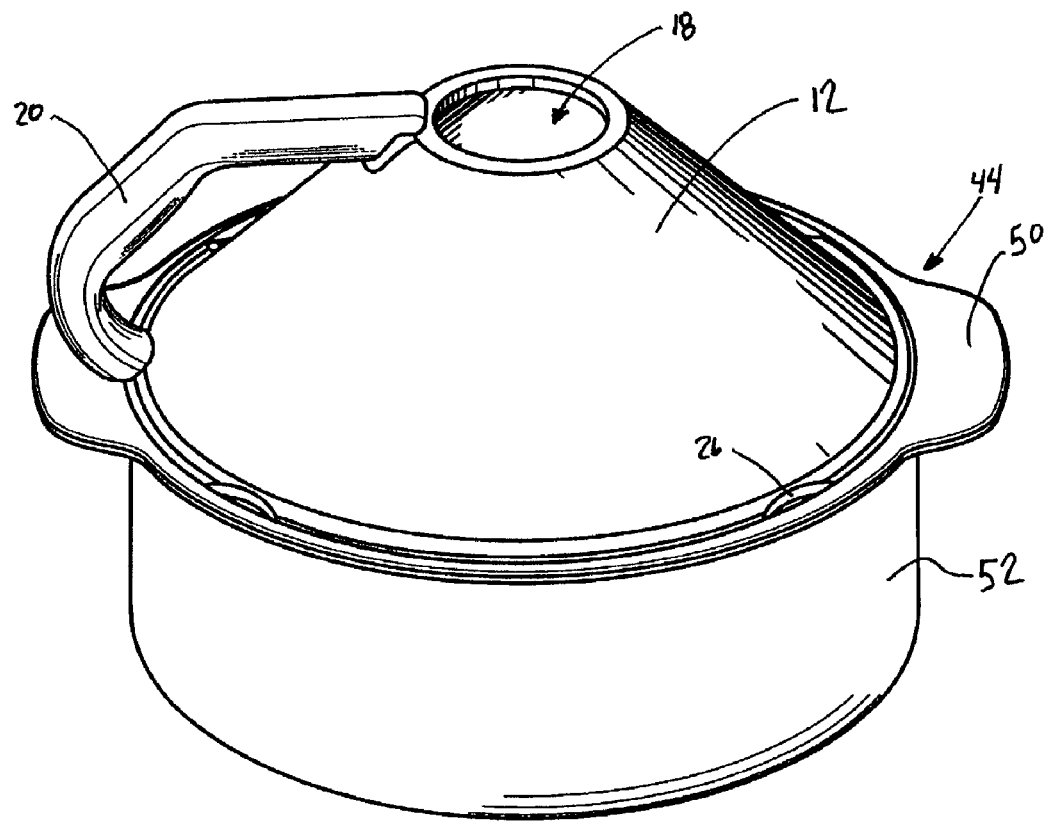

FIG. 5 is a perspective view of the combination cone and steamer tray showing the device in use, placed on a cooking pot, according to one aspect of the present invention.

Figure 6:
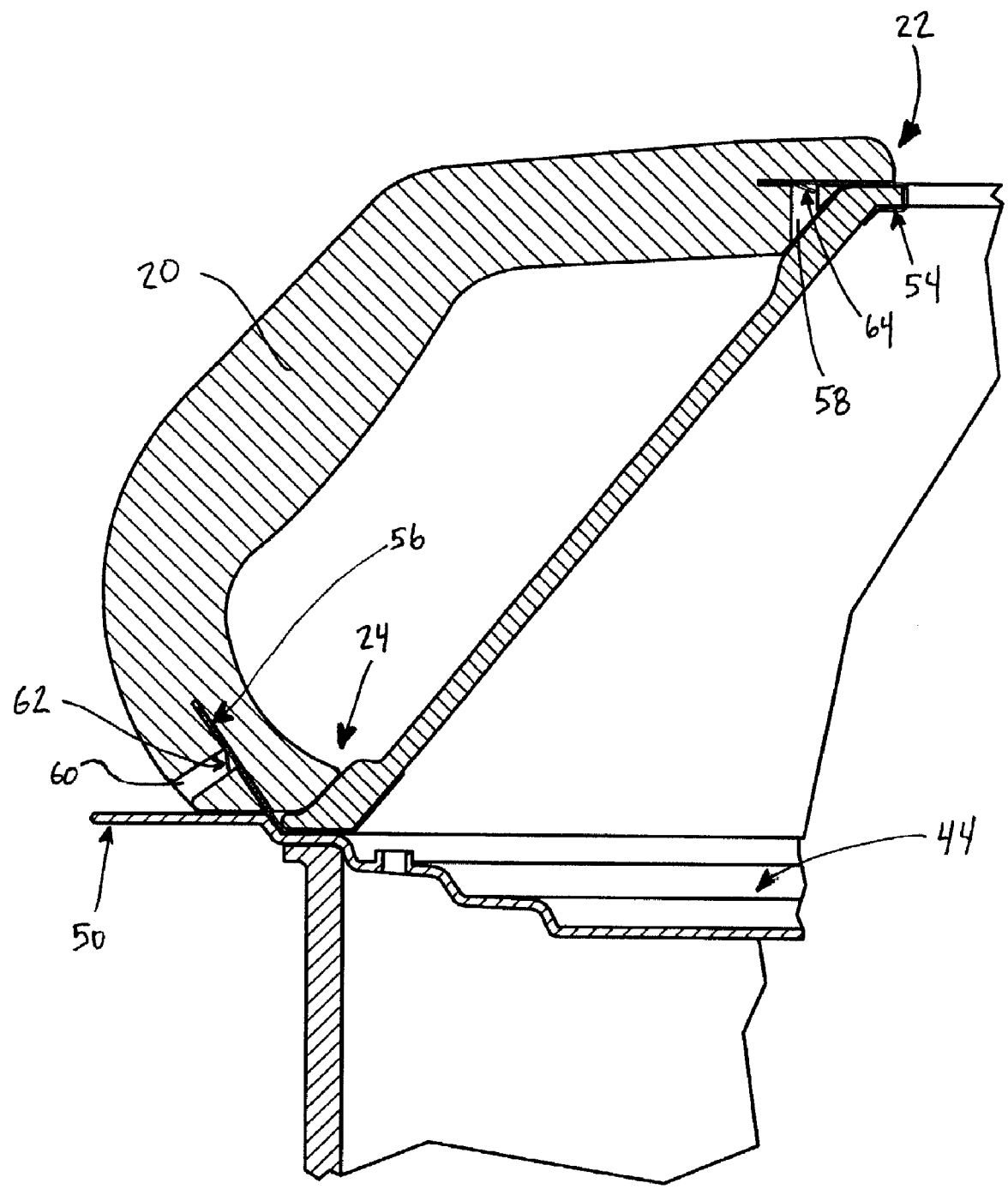

FIG. 6 is a cross sectional view of the handle of the cone, showing the clips attaching the handle to the cone, according to one embodiment of the present invention.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A description of each and every use of a device in accordance with the present invention will be too voluminous to include herein, so the present disclosure is directed to those embodiments and uses that are believed to most clearly be representative of the present invention. However, the present invention should not be limited merely to the embodiments and uses disclosed herein, but should be construed to include all of the concepts and teachings disclosed herein.

FIG. 1 is a perspective view of a combined cone and collection rim 10, according to one embodiment of the invention. The combined cone and collection rim 10 generally comprises a cone 12, a handle 20 attached thereto, and a collection rim 14. As illustrated in FIG. 1, the cone 12 is funnel-shaped, and includes an opening 18 in the top of the cone 12. The sloped side of the cone 12 terminates in a flat upper surface 17 which defines the opening 18. Likewise, the sloped side of cone 12 terminates, at a bottom of the cone, in a flat edge 19 protruding radially outward from the central axis (not illustrated) of the cone 12.

According to a preferred embodiment of the invention, the cone 12 is constructed of heat resistant glass, such as borasilicate glass, thick enough to withstand high temperatures, such as up to 375 degrees Fahrenheit, typically generated during cooking. Constructing the cone 12 of glass also permits a user to view the contents of the pot or pan upon which the combined cone and collection rim 10 is placed. It will be appreciated, however, that the cone 12 may be made of other materials commonly used in cookware, such as plastics, stainless steel, copper, and the like, which may withstand high temperatures produced during cooking.

As shown in FIG. 1, the cone 12 includes at least two crescent-shaped cut outs or indentations 26 in the flat edge 19. According to a preferred embodiment of the invention, the cone 12 includes four (4) such indentations each separated by 90 degrees. The purpose of the indentations 26 is to allow the cone 12 to receive and removably attach to the collection rim 14. The collection rim 14 includes a plurality of clips 16, the number of which correspond to the number of indentations in the cone 12. FIG. 1 illustrates that the clips 16 engage the upper surface of the flat edge 19 when the cone 12 is attached to the collection rim 14. The indentations 26 allow the cone 12 to be removed from the tray when each of the clips 16 are lined up with the indentations 26, due to the failure of the clips to engage any portion of the flat edge 19. Therefore, to effect attachment of the collection rim 14 to the cone 12, or vice versa, the clips 16 are lined up with the indentations 26 and the tray 14 or cone 12 is rotated in either a clockwise or counterclockwise direction so as to enable the clips 16 to engage the upper surface of the flat edge 19. To effect detachment of the collection rim 14 and cone 12, the opposite steps are taken. According to one embodiment of the present invention, the clips 16 are integrated with the collection rim 14, which is preferably constructed out of stainless steel. Alternatively the clips 16 may be removably attached to the collection rim 14 by any suitable means, such as by screws.

FIG. 1 also shows a handle 20 attached to the cone 12 at the top 22 of the cone 12 and at the bottom 24 of the cone 12. The handle 20 includes a central portion 21 that is substantially parallel with the side of the cone 12. The handle 20 is preferably constructed of heat-resistance plastic formed using an injection-molded process, as is well known in the art. The handle 20 may also be formed using compression molding or other techniques for forming plastic parts. Although heat-resistant plastic is preferred to insulate a user's skin from heat conducted by the cone 12 and collection rim 14, it will be appreciated that other materials may be used, including stainless steel.

FIG. 2 shows a partial cross sectional view of a side of the combined cone and collection rim 10 of FIG. 1, according to one embodiment of the present invention. The cross sectional view illustrates a clip 16 of the collection rim 14 engaging the flat edge 19 of the cone 12. As illustrated in FIG. 2, the clip 16 is integrated with the collection rim 14, which is positioned substantially below the cone 12. According to one aspect of the invention, the flat edge 19 of the collection rim may include bumps 23 protruding there from, and located on each side of each indentation 26. The bumps 23, not illustrated in FIG. 1, prevent the collection rim 14 or cone 12 from any undesirable rotation that could cause the clips 16 to align with the indentations 16, causing the collection rim 14 and cone 12 to become unattached. Therefore, the bumps 23 are of adequate height so that sufficient pressure must be applied to the cone 12 or collection rim 14 to persuade the clip 16 to sufficiently deform and slide over the bumps 23. Requiring the application of pressure thus prevents the collection rim 14 and cone 12 from becoming separated due to only an incidental movement of the collection rim 14 or cone 12 that is not intended to detach the two elements from each other.

FIG. 2 also illustrates, in part, the shape of the collection rim 14. As shown in FIG. 2, the collection rim includes a series of graduated concentric levels 30, 32, 33 between the top and outermost portion of the collection rim 14 and the bottom of the collection rim 14. The graduated concentric levels 30, 32, 33 allow the combined cone and collection rim 10 to be used with a wide range of pots and pans because the underside of the graduated concentric levels 30, 32, 33 can engage (i.e., rest upon) the top edges of a pots an pans (collectively referred to hereafter only as 'pots') having varying width. For instance, the inner concentric level 33 may rest upon the top edge of a small pot to support the combined cone and collection rim 10, whereas the external concentric level 30 may rest upon the top edge of a larger pot to support the combined cone and collection rim.

The middle and inner graduated concentric levels 32, 33 are also sloped slightly downward toward the interior of the collection pan so that liquid on the middle concentric level 32 will flow toward the inner concentric level 33, which is lower than the middle concentric level 32. Furthermore, according to one embodiment of the invention, the middle concentric level 32 of the collection rim 14 includes a plurality of circular through holes located therein. One such through hole 42 is illustrated in FIG. 2 in cross-section. The through hole 42 includes a side wall 43 extending upward from the middle concentric level 32. This side wall 43, as will be described in further detail below, prevents liquid collected in the collection tray 14 from spilling through the hole, e.g., into a pot beneath the collection rim 14. According to another embodiment of the invention, the middle concentric level 32 of the collection rim 14 does not include any through holes located therein.

FIG. 3 is a exploded view of the combined cone and collection rim of FIG. 1, including a cap 34, according to one embodiment of the present invention. The cap 34 includes a vertical member 38 extending vertically from the body of the cap 34 to enable a use to grip the cap 34. The cap 34 also includes at least two outwardly extending tabs 36 that engage the interior edge 39 of the flat upper surface 17 defining defines the opening 18 as the cap is placed on, or removed from the cone 12. The tabs 36 extend outward to provide sufficient resistance so that the cap 34 remains securely on the cone 12 unless an adequate force pulls vertically on the cap 34, e.g., using the vertical member 38. According to a preferred embodiment of the present invention, the cap 34 includes three such tabs 36 located 120 degrees from each other. Furthermore, according to another preferred embodiment, the cap 34 is constructed out of injection molded plastic, or of material matching that of the handle 20.

FIG. 3 further illustrates how the collection rim 14 is removably engaged to the cone 12. As shown by the orientation of the collection rim 14 and cone 12 in FIG. 3, the indentations 26 allow the cone 12 to be removed from the tray when each of the clips 16 are lined up with the indentations 26, due to the failure of the clips to engage any portion of the flat edge 19. Likewise, when the cone 12 and rim 14 are separated, the orientation shown in FIG. 3 allows the cone 12 and rim to be combined. To effect attachment of the collection rim 14 to the cone 12, or vice versa, the clips 16 are lined up with the indentations 26 (as illustrated) and the tray 14 and cone 12 are brought together as illustrated by the direction arrows 40 of FIG. 3. As further illustrated by the direction arrows 40, after the tray 14 and cone 12 are brought together, the cone may be rotated in a clockwise (or counterclockwise) direction so as to enable the clips 16 to engage the upper surface of the flat edge 19. Alternatively, the collection rim 14 may also be rotated.

FIG. 3 also further illustrates the shape of the collection rim 14. The collection rim includes an outer wall 47 and an inner wall 45, between which the series of graduated concentric levels 30, 32, 33 are situated. The inner wall 47 of the collection rim 14 defines the central opening 49 of the rim 14. The embodiment illustrated in FIG. 3 also includes the plurality of through holes 42, each of which have vertical side walls 43.

The purpose and advantages of the collection rim 14 will now be described. It will be appreciated that the collection rim 14 permits heat and moisture from a pot upon which it rests to pass through its central opening 49. Where the collection rim 14 sits on a large pot such that the exterior concentric level 30 rests upon the top edge of a larger pot to support the combined cone and collection rim 10, the through holes 42 also permit heat and moisture to pass there through. During cooking, moisture from the food or liquids in the pot upon which the combined cone and collection tray 10 rests will rise and collect on the inner wall of the cone 12. The moisture will then cascade down the sloped wall and collect in the collection rim 14. More specifically, the moisture will collect between the inner wall 45 of the collection rim 14 and the exterior wall 57 defining the outermost and highest portion of the middle concentric level 32. The sidewalls 43 of the through-holes 42 prevent most of the liquid collected in the collection tray from falling back into the cooking pot upon which the combined cone and tray 10 rests.

The combined cone and tray 10 collects moisture while simultaneously permitting the user to control whether heat escapes through the opening 18 in the top of the cone 12 by the inserting or removing the cap 34. It will be appreciated that this is extremely useful in a wide variety of cooking situations. For instance, when heating a sauce in which one wishes to cook away excess water or moisture to effectively thicken the sauce, the collection tray enables the collection and removal of excess moisture during cooking while simultaneously preventing heat from escaping. Because the cone and collection tray 10 rests on the top edge of a pot, the excess moisture can be dumped easily by the user during cooking using the handle 20.

FIG. 4 is a perspective view of a steamer tray 44 for use with the cone illustrated in FIGS. 1–3, according to another embodiment of the present invention. The steamer tray 44 is identical to the collection rim 14 discussed above with reference to FIGS. 1–3, but for three differences. First, the steamer tray 44 includes a recessed center portion having multiple holes 48 therein which allow moisture to flow there through and back into a pot upon which the tray 44 rests. Therefore, the steamer tray 44 does not include an inner wall 45 permitting the tray to collect and retain moisture, as in the collection rim 14 discussed above. Second, the steamer tray 44 includes two flanges 50 extending outward from the top of the tray 44. Third, the steamer tray 44 does not include the clips 16; the cone 12 illustrated in FIGS. 1–3 therefore simply rests on top of and within the uppermost and outermost wall the steamer tray.

FIG. 5 is a perspective view of the cone 12 and steamer tray 44 showing the two devices in use, placed on a cooking pot 52, according to one aspect of the present invention. The combination cone and steamer tray 44 functions similar to a conventional steamer tray in that food is played on the steamer tray, after which steam passes through the holes 48 therein to cook the food. The combination cone and steamer tray 44 of the present invention provides additional features not provided by the prior art. The sloped side of the cone 12 allows most of the moisture produced by the pot 52 to collect on the wall of the cone 12, after which it immediately cascades down the cone wall and back into the pot through the holes 48 in the steamer tray 44. The opening 18 in the top of the cone 12 permits heat to pass there through. Finally, the two flanges 50 allow the user to pick up the steamer tray 44.

FIG. 6 is a cross sectional view of the handle 20 of the cone 12, showing the clips 54, 56 attaching the handle 20 to the cone 12 at the top 22 of the cone 12 and at the bottom 24 of the cone 12. As illustrated in FIG. 6, the invention the clips 54, 56 are at least partially inserted into the body of the handle 20. According to one aspect of the invention, the clips 54, 56 each contain spring members 60, 64 which are respective small sections bending outward from the body of the clips. These small sections 62, 64 permit the clips 54, 56 to be inserted in a narrow clip-receiving cavity for receiving the clips 54, 56 are the respective ends 22, 24 of the handle 20. However, as illustrated by their position in FIG. 6, the small sections 62, 64 spring outward after reaching respective cavities 58, 60 drilled or formed in the handle 20. Therefore, once the clips 54, 56 are inserted into the handle they permanently affix the handle 20 to the cone 20. The clips are preferably made of steel or another durable and strong material to support at least the weight of the cone 12 and rim 14.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the present invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A cooking device, comprising;
a cone comprising a top, a bottom, and a sloped side located there between;
a handle, attached to said cone; and
a collection rim removably affixed to said cone, wherein said collection rim includes a hole disposed in the center thereof, said hole being larger than, and disposed directly beneath, the top of said cone;
wherein said collection rim comprises a plurality of through holes, the centers of each of said through holes being arranged to define a single circle of through holes distributed in said collection rim, wherein each of said plurality of through holes comprises side walls extending vertically from, and defining the center of, said through holes.

2. The device of claim 1, wherein the cone top comprises a small opening therein, and wherein the cone bottom comprises a substantially flat edge protruding there from.

3. The device of claim 2, further comprising a cap, said cap being removably inserted into the small opening of said cone top.

4. The device of claim 1, wherein said collection rim further comprises a plurality of graduated concentric levels, said graduated concentric levels operable to engage cooking pots of varying widths.

5. The device of claim 4, wherein said plurality of through holes are each located in a single graduated concentric level of said collection rim.

6. The device of claim 5, wherein said collection rim further comprises an inner wall, said inner wall defining the inner edge of a collection area operable to retain moisture.

7. The device of claim 6, wherein said cone comprises heat resistant glass, and wherein said collection rim comprises stainless steel.

8. The device of claim 7, wherein said cone comprises heat resistant glass, and wherein said collection rim comprises stainless steel.

9. The device of claim 8, wherein said handle comprises injection-molded plastic.

10. The device of claim 2, wherein the substantially flat edge includes at least two indentations therein.

11. The device of claim 10, wherein the collection rim comprises at least two clips formed therein, and wherein said at least two clips engage the substantially flat edge of the cone to removably affix the collection rim to the cone.

* * * * *